United States Patent Office 2,730,504
Patented Jan. 10, 1956

2,730,504

TIN ACTIVATED BARIUM PHOSPHATE PHOSPHOR

Alfred H. McKeag, North Wembley, England, assignor to General Electric Company, a corporation of New York No Drawing. Application October 9, 1951, Serial No. 250,561

Claims priority, application Great Britain November 1, 1950

2 Claims. (Cl. 252—301.4)

This invention relates to artificial luminescent materials, one of its objects being to provide luminescent materials which differ from previously known luminescent materials in their composition, and which are suitable for use in fluorescent electric discharge lamps or for cathode ray tube screens or for X-ray screens, or for two or more of these purposes. The invention also relates to a method of manufacturing such luminescent materials and to combinations of such luminescent materials with electrical means for exciting them to luminescence, for example electric discharge lamps and cathode ray tubes.

Luminescent materials comprising barium phosphates with various metallic activators have previously been described, the composition of these known materials corresponding to that of the metaphosphate ($Ba(PO_3)_2$) or to more acid phosphates, that is to say to phosphates containing an even higher proportion of phosphorus pentoxide ($P_2O_5$) than the metaphosphate. I have now found that barium phosphates which are more basic in composition than the metaphosphate, that is to say which contain a smaller proportion of phosphorus pentoxide than that corresponding to the metaphosphate composition, when activated by tin form a series of luminescent materials exhibiting a useful range of colors of luminescence.

According to the present invention, therefore, an artificial luminescent material comprises barium phosphate activated by tin, the barium phosphate being of a composition containing a smaller proportion of phosphorus pentoxide than that corresponding to the metaphosphate composition.

The luminescent materials according to the invention may vary in composition over a wide range between that of the pyrophosphate and that of the metaphosphate, and may even be slightly more basic than the pyrophosphate. Thus, useful luminescent materials have been produced having a composition approximating that of the pyrophosphate, or containing up to about 2% (by weight) excess of barium oxide over that in the pyrophosphate, or containing up to about 40% (by weight) excess of phosphorus pentoxide over that in the pyrophosphate.

The luminescent materials of the invention are excited to luminescence by ultraviolet radiation of wavelength 2537 A., by X-rays, and by cathode rays. A wide range of colors of luminescence is obtainable, including various shades of green, red and blue, and white, and gradations between these colors. The color of luminescence exhibited by any one material depends upon the composition of the material and upon the method of preparation employed, as will be explained hereinafter. Most, if not all, of the luminescent materials of the invention are also characterized by the fact that the afterglow, or maintenance of luminescence after removal of the exciting agency, exhibited by them is of extremely short duration. This property is advantageous for some applications, for example for certain applications of cathode ray tubes.

The proportion of tin required to function as activator for the luminescent materials of the invention is not critical, and may be varied over a wide range, say from 0.001% to 10% by weight of the material, but I have found that particularly useful materials are obtained when the amount of tin used is about 1% to 2% by weight of the material. It is apparently desirable that the tin should be present in the divalent state, and it is therefore usually preferable to introduce the tin in the form of a stannous compound, such as stannous chloride, $SnCl_2$. Moreover, the material is preferably heated in a reducing atmosphere during at least a part of the process of manufacture.

Thus a process for manufacturing a luminescent material according to the invention includes the step of heating at an elevated temperature, for example between 600° C. and 1200° C., and in a reducing atmosphere, preferably hydrogen, a barium phosphate of a composition containing a smaller proportion of phosphorus pentoxide than that corresponding to the metaphosphate composition, or a substance or substances adapted to produce such a barium phosphate during the heating, together with tin or a compound thereof.

In one method of carrying out the process, the said substance heated may be a precipitated barium phosphate of such composition that, on heating, it is converted to a barium phosphate of the composition required for the luminescent material. For example, if it is required to produce barium pyrophosphate, the substance to be heated may be barium hydrogen phosphate, $BaHPO_4$, obtained by precipitation from solutions of a barium compound and a phosphate, for example barium chloride, $BaCl_2$, and diammonium hydrogen phosphate,

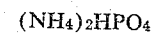

$(NH_4)_2HPO_4$

If it is desired to obtain a material of composition other than the pyrophosphate, the composition of the final product may be adjusted as required by adding to the precipitated barium phosphate, before heating, a suitable amount of a barium compound or a phosphate capable of decomposing during the heating to increase the content of barium oxide or phosphorus pentoxide, respectively, in the product. The preferred additives for this purpose are barium carbonate, for increasing the barium oxide content, and diammonium hydrogen phosphate, for increasing the phosphorus pentoxide content.

The precipitated barium phosphate, after washing and drying, may be mixed with tin or a tin compound and the mixture heated, or a soluble tin compound may be added to the solution of a barium compound so that a tin compound is co-precipitated with the barium phosphate, and the combined precipitate heated, in either case an additive as aforesaid being mixed with the precipitate if required.

An alternative method of producing a material of a more acid composition than the pyrophosphate comprises mixing barium pyrophosphate and barium metaphosphate, together with tin or a tin compound, and heating this mixture as described.

In another alternative method of carrying out the process, a powdered mixture comprising a barium compound, such as barium carbonate, a phosphate, preferably diammonium hydrogen phosphate, and tin or a tin compound, is heated as aforesaid.

Preferably, the heating is carried out in a reducing atmosphere during a part of the process, one or more stages consisting of heating in air being also included in the process. I have found that, to produce luminescent materials in accordance with the invention having the optimum brightness of luminescence, it is usually desirable to carry out the heating in three stages, the first stage being effected in air, the second in hydrogen, and the third again in air.

As indicated above, the variable factors which have the greatest importance in determining the colors of luminescence exhibited by different luminescent materials according to the invention are, in each case, the composition of the material and the method of manufacture, particularly in regard to the temperature at which the heating in hydrogen is carried out and the length of time for which this heating step is continued. The effects of composition and hydrogen firing temperature on the color of luminescence have been investigated by preparing a large number of samples, all starting from the same batch of precipitated barium hydrogen phosphate (which is converted to barium pyrophosphate on heating) and all containing the same proportion of tin (2% by weight), co-precipitated with the barium phosphate. The compositions of the samples were varied, in most cases, by adding different amounts of barium carbonate or diammonium hydrogen phosphate, the pyrophosphate composition being retained in some cases, and samples of all the compositions produced were fired in hydrogen at a number of different temperatures from 700° C. upwards.

The results of the above investigation showed, for example, that samples of the barium pyrophosphate composition or containing a slight excess of barium oxide, when fired in hydrogen at a temperature of 700° C., exhibited a green fluorescence, which changed, with increasing phosphorus pentoxide content, through shades of green and bluish-green to bluish-white and ultimately to white when the amount of added ammonium phosphate was 20% by weight of the fired product, constituting an excess of 34% by weight of $P_2O_5$ over the pyrophosphate. None of the samples showed a green fluorescence when fired at temperatures of 800° C. or higher, the more basic samples fired at these temperatures showing a range of reddish and pink colors, changing through mauves to blue shades and finally grading into white, with increasing phosphorus pentoxide content. As the firing temperature increased, the range of compositions having a reddish fluorescence was extended, a larger addition of diammonium hydrogen phosphate in general being required to produce a white fluorescence.

The addition of barium carbonate to the precipitated barium hydrogen phosphate, to produce materials containing excess of barium oxide over the pyrophosphate composition, appeared to have little effect on the color of the fluorescence, which was green for samples fired in hydrogen at 700° C. and reddish for those fired at higher temperatures. It was found, however, that the brightness of the luminescence diminished rapidly with the addition of increasing proportions of excess barium oxide, the limit of basicity for the production of useful luminescent materials being about 2% of barium oxide over that contained in the pyrophosphate composition.

It will be apparent, from the results of the investigation described above, that it is possible to produce luminescent materials, in accordance with the invention, of different colors within the available range of greens, reds, blues and white, and the gradations between these colors, by suitably adjusting the composition of the material heated, and regulating the temperature at which the heating steps, particularly that in hydrogen, are carried out, the precise conditions required for obtaining any particular color being determined by trial.

The preferred method of manufacturing a luminescent material according to the invention, having a particular color of luminescence, therefore comprises precipitating tin-containing barium hydrogen phosphate, $BaHPO_4$, from solutions of diammonium hydrogen phosphate and salts of barium and tin, preferably barium chloride and stannous chloride, washing and drying the precipitate, if necessary adding an amount of barium carbonate or diammonium hydrogen phosphate which will give a composition adapted to have the required color of luminescence, and heating the mixture in air, then in hydrogen, and finally in air again, at a temperature and for a time such that the product shows the required color of luminescence. The preferred proportion of tin is 2% by weight of the material. In order to ascertain the proportion of barium carbonate or diammonium hydrogen phosphate, if any, which is required to be added to any particular batch of precipitate to produce a material with the desired color of luminescence, it is usually necessary to carry out a series of tests, incorporating different proportions of the additive in several different samples of the batch, and heating different portions of the samples at varying temperatures, thus determining by trial the optimum combination of composition and temperature for producing the desired color.

It is to be understood that the materials used in the manufacture of the luminescent materials of the invention should be of a high degree of purity, as is usual in the manufacture of luminescent materials.

Some specific methods of preparing luminescent materials, in accordance with the invention, each of which materials exhibits a different color of fluorescence under excitation by ultraviolet radiation of wavelength 2537 A., will now be described by way of example.

*Example 1*

A solution (solution A) of barium chloride and stannous chloride is prepared by dissolving 1222 gms. of barium chloride, $BaCl_2.2H_2O$, in 3 litres of distilled water, heating this solution to 60° C., adding 42.6 gms. of stannous chloride, $SnCl_2.2H_2O$, and 5 ml. of concentrated hydrochloric acid, and stirring thoroughly.

A second solution (solution B) of ammonium phosphate is prepared by dissolving 685 gms. of diammonium hydrogen phosphate, $(NH_4)_2HPO_4$, in 2 litres of distilled water and heating to 60° C.

Solution B is added slowly to solution A with constant stirring, stirring is continued for 5 minutes after the addition is completed, and the mixture is allowed to stand for two hours, at the end of which time the precipitate has settled completely. The mixture is then filtered, and the precipitate is washed ten times with cold distilled water and dried at 200° C. The product, which consists substantially of barium hydrogen phosphate, $BaHPO_4$, and contains an amount of tin such as to give about 2% by weight of tin in the heat treated product of the precipitate, forms the starting material for the production of the luminescent materials as described in this and the following examples.

For the production of a green fluorescing material, 10.4 gms. of the precipitate prepared as described above are placed in a silica tube and heated in air at 800° C. for half an hour, the product of this heating is ground and is then heated in hydrogen at 700° C. for one hour, and the material is re-ground and re-heated in air at 700° C. for half an hour.

The final product shows a bright fluorescence of a pale green color.

*Example 2*

10.4 gms. of the precipitate, whose preparation is described in Example 1, is heated in a silica tube in air at 900° C. for 2 hours, ground, heated in hydrogen at 800° C. for one hour, re-ground, and re-heated in air at 900° C. for one hour.

The product shows a red fluorescence.

*Example 3*

52 gms. of the precipitated barium hydrogen phosphate, prepared as described in Example 1, are ground with about 6 gms. of diammonium hydrogen phosphate, $(NH_4)_2HPO_4$, and the mixture is heated in air at 850° C. for one hour, ground, heated in hydrogen at 850° C. for half an hour, re-ground, and re-heated in air at 850° C. for half an hour.

The product shows a strong blue fluorescence. In order to determine the exact amount of additional diammonium hydrogen phosphate to use, several 52 gm. portions of the precipitate, to which different amounts of $(NH_4)_2HPO_4$ ranging from 5 gms. to 7.5 gms. have been added, are treated as described above, and the amount which gives a product showing the required shade of blue fluorescence is selected.

Example 4

52 gms. of the precipitate, prepared as described in Example 1, is ground with about 11 gms. of diammonium hydrogen phosphate. The mixture is heated in air at 800° C. for 2 hours, ground, heated in hydrogen at 700° C. for ½ hour, re-ground, and re-heated in air at 900° C. for 2 hours.

The product shows a white fluorescence. The optimum amount of diammonium hydrogen phosphate to be added to the precipitate is determined precisely by carrying out a series of tests, as described in Example 3, adding amounts of $(NH_4)_2HPO_4$ ranging from 10 to 12 gms.

What I claim as new and desire to secure by Letters Patent of the United States is:

1. The method of manufacturing a red-fluorescing phosphate of barium activated by tin which comprises forming a mixture of barium hydrogen phosphate and an activating tin compound in an amount such as to give about 2% by weight of tin in the final product, and firing the mixture in successive steps in air at about 900° C. for about two hours, in hydrogen at about 800° C. for about one hour and again in air at about 900° C. for about one hour.

2. A red-fluorescing tin-activated pyrophosphate of barium prepared as set forth in claim 1.

References Cited in the file of this patent

UNITED STATES PATENTS

| 2,270,124 | Huniger | Jan. 13, 1942 |

FOREIGN PATENTS

| 578,272 | Great Britain | June 21, 1946 |